United States Patent [19]

Pirani et al.

[11] Patent Number: 4,580,275

[45] Date of Patent: Apr. 1, 1986

[54] ADAPTIVE EQUALIZER FOR BINARY SIGNALS AND METHOD OF OPERATING SAME

[75] Inventors: Giancarlo Pirani; Valerio Zingarelli, both of Turin, Italy

[73] Assignee: SIP - Societa Italiana per l'Esercizio Telefonico S.p.A., Turin, Italy

[21] Appl. No.: 640,513

[22] Filed: Aug. 13, 1984

[30] Foreign Application Priority Data

Aug. 11, 1983 [IT] Italy .................. 67864 A/83

[51] Int. Cl.$^4$ ............................. H04B 3/14
[52] U.S. Cl. ................................ 375/16; 364/724; 375/14
[58] Field of Search .............. 375/12, 14, 16; 333/18; 364/724; 367/45; 358/905

[56] References Cited

U.S. PATENT DOCUMENTS

| | | | |
|---|---|---|---|
| 3,571,733 | 3/1971 | Fang | 375/16 |
| 3,633,105 | 4/1972 | Lender et al. | 375/16 |
| 3,992,616 | 11/1976 | Acker | 375/14 |

OTHER PUBLICATIONS

A Transversal Fading Equalizer for a 16-QAM Microwave Digital Radio by Tanaka et al. IEEE International Conference Denver, Jun. 1981 pp. 46.2.1–46.2.5.
Multiplication Free Filters for Subband Coding of Speech by Pirani et al., IEEE International Symposium Rome, May 1982.
Multiplication Free Equalizers for Multipath Fading Channels by Pirani et al., IEEE International Conf. on Communications—Philadelphia, Jun. 1982.
A Comparative Evaluation of Slope Equalizers . . . by Chao et al., IEEE Globecom Conf., Miami Nov. Dec. 1982.
A Baseband Adaptive Equalizer . . . by Kuo et al. same as above.

Primary Examiner—Benedict V. Safourek
Attorney, Agent, or Firm—Karl F. Ross; Herbert Dubno

[57] ABSTRACT

An adaptive equalizer for high-speed binary signals, operating in baseband, comprises a transversal filter receiving digitized samples of incoming symbols and feeding them to a decision stage. An error signal derived from the difference between the filtered and the decided samples, for each coefficient of the transversal filter and for each iteration of the processing by that coefficient, is fed to an updating unit, where its sign is compared with the sign of the corresponding filtered sample to determine their identity or disparity. The result is a binary discriminating signal sent to a coefficient calculator and to a threshold generator which receives from that calculator the current coefficient and, dependent on the polarity of that coefficient and on the logical value of the discriminating signal, produces a threshold value to be compared with the absolute magnitude of the error signal. Whenever that absolute magnitude exceeds the existing threshold, it causes the count of an up/down counter to be incremented or decremented, depending on whether the two compared signs are different or equal. Whenever the up count of the down count reaches a predetermined limit in any cycle, the counter resets itself to zero and triggers the calculator to update the existing coefficient, again on the basis of the discriminating signal, by either halving or doubling that coefficient.

6 Claims, 3 Drawing Figures

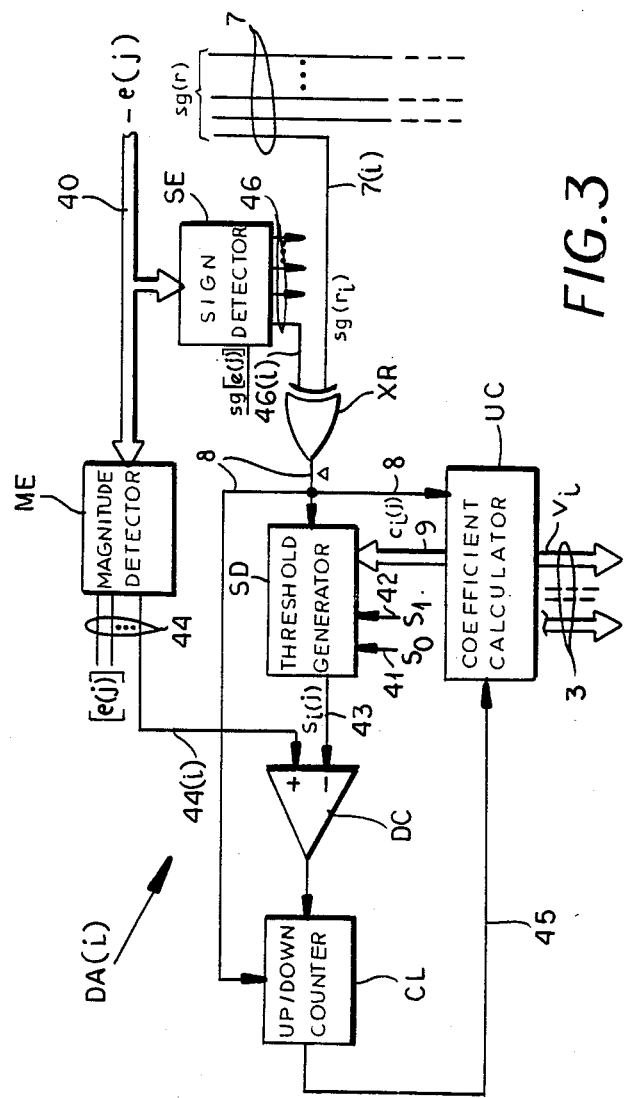

ADAPTIVE EQUALIZER FOR BINARY SIGNALS AND METHOD OF OPERATING SAME

CROSS-REFERENCE TO RELATED APPLICATION

This application contains subject matter disclosed in our copending application Ser. No. 601,983 filed Apr. 19, 1984.

FIELD OF THE INVENTION

Our present invention relates to an adaptive equalizer for the reception of binary signals, especially at high speed and by way of microwave radio links, and to a method of operating same.

BACKGROUND OF THE INVENTION

The propagation of electromagnetic waves through the atmosphere is highly dependent on the refractive index of the surrounding medium. That index is subject to random variations, being determined by altitude and meteorological conditions. These conditions tend to give rise to so-called atmospheric conduits into which the electromagnetic waves are channeled but which do not remain fixed for any length of time. In some instances, furthermore, part of the signals sent out by a transmitting antenna arrive at a receiving antenna over several paths, namely as a direct ray and as one or more rays reflected by intervening objects. The sum of the signal components traveling over these diverse paths is degraded by phase and amplitude distortions which can be considered due to alterationf of the transfer function of the transmission channel involved. The degradations are intensified with increasing transmission rates and complexity of the adopted modulation technique.

Equalizers designed to minimize these distortions can be subdivided into two major groups respectively operating with intermediate-frequency and baseband compensation.

The techniques of intermediate-frequency equalization are generally simpler, both conceptually and technologically, than those relating to baseband equalization; this particularly applies to high-speed transmission. However, i-f equalization does not always assure good compensation, as where the actual distortions deviate significantly from the expected channel distortions for which the equalizer is designed, where significant differences in delay occur among several paths over which respective signal components are received, or in the case of selective fadings affecting the signal component of highest amplitude when that component is not the one undergoing the least propagation delay.

Baseband-equalization techniques, on the other hand, are not subject to those drawbacks. These techniques do not require any precalculation of the characteristics of a given channel model and operate efficiently under the various conditions referred to above.

The most sophisticated methods of this nature (estimate of maximum likelihood of received sequences, or Kalman filtering) are very complex to implement and have therefore been applied up to now mainly in modems for data transmission over telephone lines.

With high-speed transmission over binary radio links, currently employing rates of 140 to 200 Mbit/sec, technological problems leave only two practical choices for baseband equalization, namely filtering with feedback from a decision stage or correction of the coefficients of a transversal filter preceding that stage.

Filtering with decision feedback involves not only structural complexity but also a possibility of error propagation. Thus, the symbols issuing from the decision stage are used for canceling the intersymbol interference due to so-called postcursors so that, if a decision is wrong, the intersymbol interference is doubled and the probability of error in the ensuing sequence is increased.

For the equalization of transversal filters in radio-link transmission, various systems using analog devices have been described in the literature. See, for example:

An article by S. Takenaka et al titled "A Transversal Fading Equalizer for a 16-QAM Microwave Digital Radio", published 14–18 June 1981, IEEE International Conference on Communications, Denver, Colo., pages 46.2.1–46.2.5;

an article by Y. L. Kuo et al titled "A Baseband Adaptive Equalizer for a 16-State QAM Digital System Over Mastergroup Band Analog Networks", published Nov. 29–Dec. 2, 1982, IEEE Globecom Conference, Miami, Fla., pages F.3.6.1.–F.3.6.5;

an article by C. L. Chao et al titled "A Comparative Performance Evaluation of Slope Equalizers and Decision-Directed Weight Control Equalizers", same publication, pages F3.4.1–F3.4.7.

The presence of analog multipliers, which are difficult to adjust and of considerable complexity in the case of high transmission rates, makes these systems expensive and prone to mulfunction.

Even upon a changeover from analog to digital devices, the need for such multipliers prevents a significant reduction in complexity and cost with high-speed transmission. The elimination of multipliers, in systems pertaining to phase-shift keying (PSK) and to speech transmission, has been described by us in a paper titled "Multiplication-free Equalizers for Multipath Fading Channels", published 13–18 June 1982, IEEE International Conference on Communications, Philadelphia, Pa., pages 4B.3.1–4B.3.5, and in another paper written jointly with F. Rus titled "Multiplication-free Filters for Subband Coding of Speech published 10–14 May 1982, IEEE International Symposium on Circuits and Systems. Those systems, however, lack the capacity of adapting themselves to time-varying distortions typical of channels and are therefore unsuitable for the type of equalizer here considered.

OBJECTS OF THE INVENTION

An object of our present invention, therefore, is to provide a method of so operating a baseband equalizer for high radio reception of binary signals as to obviate the need for multipliers, facilitate implementation by fully digital proc and automatically compensate time-variable distortions with adaptation speed sufficient for the transmission requirement terrestrial microwave radio links.

A related object is to provide means in a receiver such signals for carrying out that method.

SUMMARY OF THE INVENTION

In accordance with our present invention, a method of operating an adaptive baseband equalizer for the compensation of distortions undergone by binary signals arriving at high rate over an incoming channel— e.g. a radio link—at a receiving station equipped with such an equalizer, which includes a transversal filter inserted between an analog/digital converter and a decision stage, comprises the following steps:

First, the transversal filter is loaded with an initial set of corrective coefficients represented by powers of 2. Next, a predetermined number of consecutive multibit samples, extracted by the analog/digital converter from respective symbols of the incoming signal flow and including each a sign bit, are multiplied with respective corrective coefficients in the transveral filter during each of a succession of clock cycles recurring at a cadence which corresponds to the rate of arrival of the symbols. The samples so multiplied in each cycle are additively combined to generate a filtered word or sample fed to a decision stage for transformation into a decided word or symbol. The filtered word and the corresponding decided word are then compared in each cycle and, if a discrepancy exists between them, a multibit error word including a sign bit is produced. In each cycle, and for each corrective coefficient, the sign bit of the error word is compared with the sign bit of the multibit sample multiplied by the respective coefficient to produce a binary discriminating signal which assumes a first logical value in the event of equality and a second logical value in the event of a disparity of the two sign bits. By multiplying the absolute magnitude of the respective coefficient with a first factor which may be either 1 or $\frac{1}{2}$, according to the current logical value of the discriminating bit and the polarity of that coefficient, a temporary threshold value is established, possibly after further multiplication with a predetermined constant and/or addition of another predetermined constant. A comparison of the absolute magnitude of the error word with the threshold value so established shows whether or not that absolute magnitude exceeds the threshold value; if it does, an incremental unit is counted in the presence of one logical value and a decremental unit is counted in the presence of the other logical value of the discriminating signal. When the resulting count reaches a predetermined limit, either on the upcount or on the downcount, that count is returned to zero while the respective coefficient is multiplied with a second factor that could be either 2 or $\frac{1}{2}$, according to the current logical value of the discriminating bit and the polarity of that coefficient. This factor is so chosen that the updated coefficient tends to reduce any discrepancy between filtered and decided words.

If, for instance, the decided word is more positive than the filtered word so that the error is of positive sign, a reduction of the coefficient here considered (if of positive polarity) may be called for in order that the filtered word be decreased in magnitude to a sufficient extent to let the decision stage choose the lower of the two levels which may correspond thereto. The updating would then be a halving. If the error were negative under otherwise like circumstances, the existing coefficient would be doubled.

The opposite procedure, however, is also conceivable. Thus, a doubling of the existing coefficient under the circumstances first described would bring the filtered word closer to the level of the decided word and thereby reduce the discrepancy between them.

The doubling or halving of any coefficient does not, of course, change its character as a power of 2.

A receiver embodying our invention, designed to carry out the aforedescribed updating operations in real time, includes an equalizer whose transversal filter is similar to that shown in our copending application identified above, comprising a delay line consisting of a group of (n−1) first shift registers of (N−1) stages each and a group of N second shift registers in which the current and prior samples are multiplied by the respective coefficients, n being the number of bits of a sample and N being the number of these coefficients. The filter is further provided with a set of output leads each carrying the sign bit of the multibit sample which in a given cycle is loaded into a second shift register for multiplication by a respective coefficient. A first comparator, with inputs connected across the decision stage, translates any difference between the filtered and decided words in each cycle into the multibit error word referred to above. The absolute magnitude or modulus of that error word is extracted by a first detector whereas the sign bit of the error word is extracted by a second detector, both common to all N coefficients. A set of N second comparators, individual to respective coefficients and advantageously designed as Exclusive-OR gates, each have an input connected to the second detector for receiving the extracted sign bit of the error word and another input connected to the one output lead of the filter which carries the sign bit of the sample supplied to the second shift register associated with the respective coefficient. Each second comparator thus generates the binary discriminating signal already referred to.

A set of N updating circuits, individual to each coefficient, generates stepping commands for the second shift registers respectively associated therewith and has an input connected to the corresponding second comparator for receiving therefrom the discriminating signal generated in a given cycle. A set of N threshold generators, also individual to each coefficient, each have inputs connected to the corresponding updating circuit and to the corresponding second comparator for receiving therefrom the respective coefficient and the discriminating signal generated in the given cycle in order to emit a threshold value calculated on the basis thereof. A set of N third comparators, again individual to each coefficient, each have one input connected to the first detector and another input connected to the corresponding threshold generator for ascertaining whether the absolute magnitude of the error word generated in the given cycle exceeds the corresponding threshold value. A set of N up/down counters individual to each coefficient each have an enabling input connected to the corresponding third comparator and a control input connected to the corresponding second comparator for counting incremental or decremental units as described above and, upon reaching the predetermined upcounting or downcounting limit, resetting itself to zero while triggering the corresponding updating circuit into a modification of the respective coefficient by multiplication with 2 or $\frac{1}{2}$ as already discussed.

BRIEF DESCRIPTION OF THE DRAWING

The above and other features of our invention will now be described in detail with reference to the accompanying drawing in which:

FIG. 3 is a block diagram of an updating unit also forming part of the receiver of FIG. 1.

SPECIFIC DESCRIPTION

Figure 1:
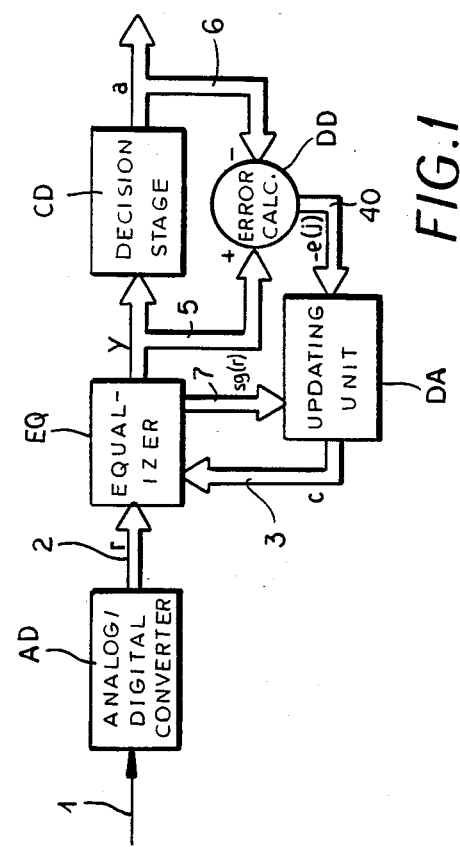
FIG. 1 is an overall block diagram of a receiver embodying our invention.

As shown in FIG. 1, a receiver of high-rate binary signals according to our invention comprises an analog/digital converter AD connected to an incoming channel such as a radio link 1. An output bus or wire multiple 2 of converter AD carries multibit samples r to an equalizer EQ for transformation into filtered words y fed on a bus 5 to a decision stage CD where they are converted into decided words a appearing on a bus 6. The sign bits sg(r) extracted at equalizer EQ from a succession of multibit samples r appear concurrently on a wire multiple 7 which feeds them to an updating unit DA supplying the equalizer on a bus 3 with corrective coefficients c used for filtering. An error calculator DD has an additive input connected to bus 5 and a subtractive input connected to bus 6 for receiving the words y and a therefrom. An inverted multibit error signal $-e(j)$, with j denoting the current filtering cycle, is delivered on a wire multiple 40 to updating unit DA.

Figure 2:
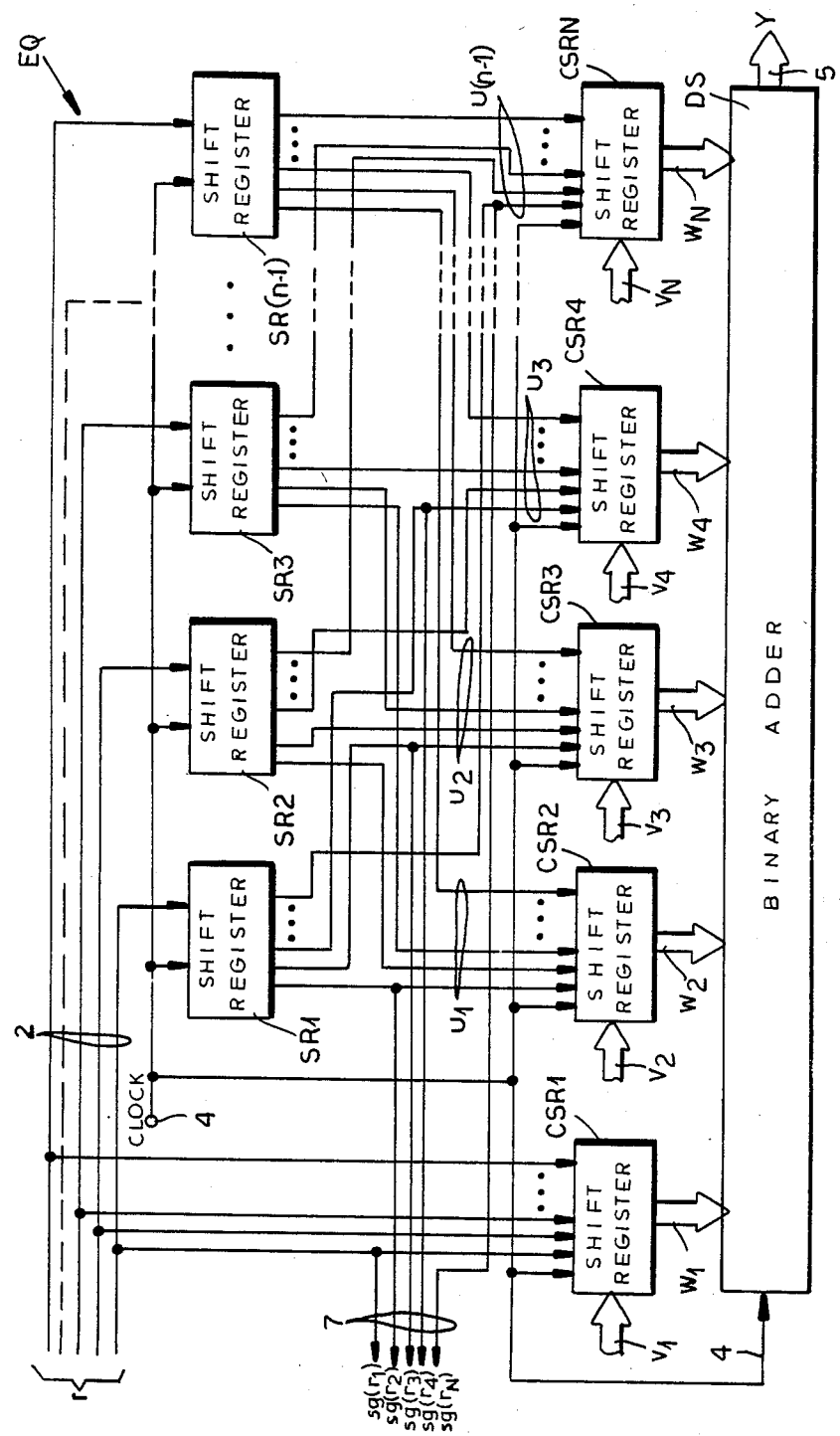
FIG. 2 is a block diagram of an equalizer included in the receiver of FIG. 1.

Details of equalizer EQ are shown in FIG. 2 which is similar to the corresponding Figure in our copending application Ser. No. 601,983. The equalizer essentially consists of a transversal filter comprising two groups of shift registers $SR1-SR(n-1)$ and $CSR1-CSRN$, with N representing the number of filter coefficients. The several bits of an incoming digitized sample, appearing on respective wires of bus 2, are fed to serial inputs of the respective registers $SR1-SR(n-1)$ which are stepped under the control of clock pulses on a lead 4, in the rhythm of the incoming symbols, and have $(N-1)$ stages each. All the bits are also supplied in parallel to respective stages of the first shift register CSR1 of the second group. All first stages of registers $SR1-SR(n-1)$, having output leads collectively labeled $u_1$, are nondestructively read out in parallel to respective stages of register CSR2 on the next clock cycle concurrently with the appearance of a new sample on bus 2. After a second clock pulse, the bits now shifted in registers $SR1-SR(n-1)$ are similarly read out to register CSR3, via leads collectively labeled $u_2$. Analogously, in a cycle or iteration following the next shift, these bits appear on leads collectively labeled $u_3$ terminating at respective stages of register CSR4. After a final shift, the bits have arrived at the last stages of registers $SR1-SR(n-1)$ and are read out to respective stages of register CSRN by way of leads collectively designated $u_{N-1}$.

The contents of registers $CSR1-CSRN$ are shiftable under the control of respective stepping commands $v_1-v_N$, forming part of connection 3 (FIG. 1), and in their shifted positions are delivered by way of respective line multiples $w_1-w_N$ to a binary adder DS which generates the output signal on line 5. Adder DS is also controlled by the clock pulses on lead 4.

The number of steps taken by each shift register $CSR1-CSRN$ corresponds to the magnitudes of the exponents of respective powers of 2, representing the N corrective coefficients c supplied to filter EQ, and the direction of the shifts depends on the signs of these exponents. It will thus be apparent that the multibit word y issuing from adder DS is the sum of a current sample and of the immediately preceding $(N-1)$ samples, each multiplied by a respective filtering coefficient.

Shift registers $CSR1-CSRN$ could be designed as multiplexers with n data inputs each and with a larger number of data outputs, connected to their respective outgoing multiples $w_1-w_N$, which are switchable by the respective stepping commands $v_1-v_N$ to load the bits of their data inputs into stages of adder DS selected in accordance with the coefficients represented by these commands. This enables a somewhat faster shifting than with conventional stage-to-stage transfer, though at the expense of greater circuit complexity.

Sign bits $sg(r_1)-sg(r_N)$ of a series of N samples $r_1-r_N$ concurrently loaded into shift registers $CSR1-CSRN$ are available at branches of leads extending from bus 2 and from shift register SR1 to the first stage of each shift register $CSR1-CSRN$, these branches forming respective leads of output multiple 7 extending to updating unit DA (FIG. 1).

Let us now consider the $i^{th}$ shift register of the second group associated with the $i^{th}$ corrective coefficient. FIG. 3 shows the section DA(i) of updating unit DA pertaining to this coefficient, along with two detectors ME and SE which are common to all N coefficients and are connected to multiple 40 for respectively extracting the absolute magnitude $|e(j)|$ and the inverted sign $$\overline{sg[e(j)]}$$

from error signal e(j). The output signal of detectors ME and SE appear identically, in a given cycle or iteration j, on respective bundles of N output leads respectively designated 44 and 46, including leads 44(i) and 46(i) particularly assigned to circuit DA(i). Lead 46(i) extends to one input of an Exclusive-OR gate XR whose other input receives the sign bit $sg(r_i)$ on lead 7(i) of multiple 7. The output of gate XR is tied to a lead 8 which carries a binary discriminatory signal $\Delta$ to a threshold generator SD, to a coefficient calculator UC and to an up/down modulo-K counter CL. Lead 44(i) terminates at an additive input of a comparator DC whose subtractive input is connected to an output lead 43 of generator SD carrying a threshold value $S_i(j)$ during the $j^{th}$ cycle. On a multiple 9 originating at calculator UC, generator SD receives the current filtering coefficient $c_i(j)$ which is also translated into the stepping command $v_i$ concurrently transmitted to the $i^{th}$ second shift register of equalizer EQ (FIG. 2).

In the most general case, the threshold value $S_i(j)$ on lead 43 has the form $$S_0 + S_1 \cdot \beta_i(i\ j) \cdot |c_i(j)|$$

where $\beta_i$ is a multiplication factor determined by the logical value of discriminating signal $\Delta$ and by the polarity of coefficient $c_i(j)$ as more fully described hereinafter. $S_0$ and $S_1$ are two fixed constants, supplied from external sources on leads 41 and 42; with $S_0=0$ and $S_1=1$, the formula for the threshold value is simplified to $\beta_i \cdot |c_i(j)|$.

Whenever comparator DC detects an excess of modulus $|e(j)|$ over threshold $S_i(j)$, it energizes an enabling input of counter CL to increment or decrement its contents, depending on the logical value of signal $\Delta$ simultaneously applied via lead 8 to a control input of that counter. Whenever the upcount (e.g. with $\Delta=1$) or the downcount (with $\Delta=0$) of the counter reaches the predetermined limit K, it resets itself to zero and energizes an output lead 45 to trigger the coefficient calculator UC into an updating operation involving a multiplication of the existent coefficient $c_i(j)$ by another factor $(1-\alpha_i)$ which may be given the value 2 or ½ again dependent on the logical value of signal Δ and on the polarity of the coefficient as more fully described below. Thus, the coefficient $c_i(j)$ remains unmodified as long as error modulus $|e(j)|$ is not greater than the current threshold.

Under the previously made assumption that an error is considered positive when the decided word or symbol $a(j)$ is more positive than the filtered word $y(j)$, the comparator of subtractor DD of FIG. 1 produces a negative multibit error signal as already noted. In accordance with the usual practice, a sign bit has the logical value 1 when positive and the logical value 0 when negative. Thus, signal $$\overline{sg[e(j)]}$$

on lead 46(i) will be 0 in the case of a positive error and 1 in the case of a negative error. Sign bit $sg(r_1)$ on lead 7(i), on the other hand, will be positive for a positive sample $r(i)$ and 0 for a negative sample. Since gate XR will emit a signal $\Delta = 1$ only when the two sign bits supplied to it are unequal, that logical value 1 will come into existence only when sample $r_1$ and error $e(j)$ are either both positive or both negative so that signal $\Delta$ represents the product of the assigned bits, assuming logical value 0 when that product is $-1$.

In order to minimize the mean square error existing during iteration j between the filtered word $y(j)$ and the outgoing decided symbol $a(j)$, we utilize the method derived from the known estimated-gradient algorithm according to which the updated coefficient $c_i(j+1)$ (assuming that updating occurs in the immediately following iteration) is given by $$c_i(j+1) = c_i(j) - k \cdot e(j) \cdot r_i$$

where k is a scale factor determining the speed of convergence of the coefficient computation. The iterative updating formula utilized with our method is written $$c_i(j+1) = c_i(j) - k \cdot sg[e(j)] \cdot sg(r_i),$$

being therefore determined by signal Δ. By replacing the second term of the foregoing equation with $\alpha_i(j) \cdot c_i(j)$, where $\alpha_i(j)$ is a new scale factor able to assume values 0, 0.5 or $-1$ as specified below, we obtain $$c_i(j+1) = c_i(j) \cdot [(1 - \alpha_i(j))]$$

insuring that the new coefficient is the product of multiplication of the old coefficient by 1, ½ or 2.

Factor $\beta_i(j)$, determining the current threshold value $S_i(j)$, has the value 1 with $\Delta = 0$ in the case of a positive coefficient and with $\Delta = 1$ in the case of a negative coefficient $c_i(j)$; it has the value 0.5 in all other instances, namely with $\Delta = 1$ in the case of a positive coefficient and with $\Delta = 0$ in the case of a negative coefficient $c_i(j)$.

The multiplier $\alpha_i(j)$ is given the value $-1$ when the coefficient $c_i(j)$ is positive and $\Delta = 0$ or when that coefficient is negative and $\Delta = 1$; this results in a doubling of the absolute magnitude of that coefficient. Multiplier $\alpha_i(j)$ is given the value 0.5 in all other instances, i.e. when the coefficients $c_i(j)$ is positive and $\Delta = 1$ or when that coefficient is negative and $\Delta = 0$; this causes the halving of the absolute magnitude of $c_i(j)$. When comparator DC has no output, $\alpha_i(j) = 0$.

Our improved equalizer can track the typical variations occurring in microwave radio channels in which selected fadings generally have rates of amplitude changes not exceeding 100 dB/sec.

With a transmission rate of, say, 35 Mbaud, corresponding to a symbol period of about 30 ns, the amplitude variation within a symbol period would be about $3\mu dB$ in the worst instance. Thus, the time required for an amplitude change by some tenths of a decibel is sufficient for the transmission of some thousands of symbols, enabling the adaptation of the filter coefficients to be conveniently carried out in the manner here disclosed.

It will thus be apparent that the described updating procedure need not necessarily be performed in each cycle or iteration but that, for example, discriminating signal Δ could be generated only after a predetermined number of cycles, thus enabling a simpler realization of the components illustrated in FIG. 3, without any significant degradation of the decided symbols.

We claim:

1. A method of operating an adaptive baseband equalizer for the compensation of distortions undergone by binary signals arriving at high rate over an incoming channel at a receiving station equipped with said equalizer, the latter including a transversal filter inserted between an analog/digital converter and a decision stage, said converter extracting multibit samples each including a sign bit from respective symbols of the incoming signal flow, comprising the steps of:
(a) loading said transversal filter with an initial set of corrective coefficients represented by powers of 2;
(b) multiplying a predetermined number of consecutive multibit samples from said converter with respective corrective coefficients in said transversal filter during each of a succession of clock cycles recurring at a cadence corresponding to the rate of arrival of said symbols;
(c) additively combining the samples so multiplied to generate in each cycle a filtered word fed to said decision stage for transformation into a decided word;
(d) comparing each filtered word with the corresponding decided word to produce in each cycle, in case of discrepancy, a multibit error word including a sign bit;
(e) comparing, in each cycle and for each corrective coefficient, the sign bit of said error word with the sign bit of the multibit sample multiplied by the respective coefficient to produce a binary discriminating signal assuming a first logical value in the event of equality and a second logical value in the event of disparity of said sign bits;
(f) establishing a temporary threshold value based upon the absolute magnitude of the respective coefficient times a first factor chosen from among 1 and ½ according to the current logical value of said discriminating signal and the polarity of the respective coefficient;
(g) comparing the absolute magnitude of said error word with said threshold value and, upon said absolute magnitude of said error word exceeding said threshold value, counting an incremental unit in the presence of one logical value and a decremental unit in the presence of the other logical value of said discriminating signal; and
(h) upon the resulting count reaching a predetermined limit, returning to a zero count while multiplying the respective coefficient with a second factor chosen from among 2 and ½, according to the current logical value of said discriminating bit and the polarity of the respective coefficient, in a sense tending to reduce any discrepancy between said filtered and decided words.

2. A method as defined in claim 1 wherein said first factor is 1 and in the case of a positive coefficient with said logical value being 0 and in the case of a negative coefficient with said logical value being 1, said first factor being ½ in all other instances.

3. A method as defined in claim 1 wherein said second factor is 2 in the case of a positive coefficient with said logical value being 0 and in the case of a negative coefficient with said logical value being 1, said second factor being ½ in all other instances.

4. A method as defined in claim 1 wherein, for a given coefficient $c_i(j)$ in a give cycle j, said threshold value $S_i(j)$ has the form $$S_i(j) = S_0 + S_1 \cdot \beta_i(j) \cdot c_i(j)$$

where $S_0$ is a constant possibly equal to 0, $S_1$ is a constant other than 0 and $\beta_i(j)$ is said first factor.

5. In a receiver for binary signals arriving at high rate over an incoming channel, including an analog/digital converter for extracting multibit samples each including a sign bit from respective symbols contained in the incoming data flow, a decision stage downstream of said converter, and an equalizer comprising a transversal filter inserted between said converter and said decision stage, said transversal filter comprising a delay line consisting of a group of (n−1) first shift registers of (N−1) stages each where n is the number of bits of a multibit sample and N is the number of corrective coefficients represented by powers of 2, a group of N second shift registers connected to receive undelayed and delayed samples from said converter and from respective stage outputs of one of said first shift registers, said second shift registers being steppable to multiply in a given operating cycle the received samples with the N coefficients respectively assigned to said second shift registers, and a binary adder connected to said second shift registers for combining in each cycle the shifted contents thereof to form a filtered word to be fed to said decision stage for transformation into a decided word, the combination therewith of:

first comparison means with inputs respectively connected to the outputs of said binary adder and of said decision stage for translating a difference between said filtered word and said decided word in each cycle into a multibit error word containing a sign bit;

first detection means common to all N coefficients connected to said first comparison means for extracting the absolute magnitude of said error word therefrom;

second detection means common to all N coefficients connected to said first comparison means for extracting the sign bit of said error word therefrom;

a set of N second comparison means, individual to respective coefficients, each having an input connected to said second detection means for receiving the extracted sign bit of the error word and another input connected to a branch of an input lead of the second shift register associated with the respective coefficient which carries the sign bit of the sample supplied to said associated second shift register in the current cycle, each of said second comparison means generating a binary discriminating signal assuming a first logical value in the event of equality and a second logical value in the event of disparity of said sign bits;

a set of N updating circuits individual to each of said coefficients generating stepping commands for the second shift registers respectively associated therewith, each of said updating circuits having an input connected to the corresponding second comparison means for receiving therefrom the discriminating signal generated in a given cycle;

a set of N threshold generators individual to each of said coefficients with inputs connected to the corresponding updating circuit and to the corresponding second comparison means for receiving therefrom the respective coefficient and the discriminating signal generated in said given cycle and for emitting a threshold value calculated on the basis thereof;

a set of N third comparison means individual to each of said coefficients, each of said third comparison means having one input connected to said first detection means and another input connected to the corresponding threshold generator for ascertaining whether the absolute magnitude of the error word generated in said given cycle exceeds the corresponding threshold value; and a set of N up/down counters individual to each of said coefficients each having an enabling input connected to the corresponding third comparison means and a control input connected to the corresponding second comparison means for counting an incremental unit in the presence of one logical value and a decremental unit in the present of the other logical value of the corresponding discriminating signal and, upon the resulting count reaching a predetermined limit, resetting itself to a zero count while triggering the corresponding updating circuit into a modification of the respective coefficient involving a multiplication by a factor chosen from among 2 and ½, according to the current logical value of the corresponding discriminating bit and the polarity of the respective coefficient, in a sense tending to reduce any discrepancy between said filtered and decided words.

6. The combination defined in claim 5 wherein each of said second comparison means comprises an Exclusive-OR gate.

* * * * *